(12) United States Patent
Chung et al.

(10) Patent No.: US 12,432,725 B2
(45) Date of Patent: Sep. 30, 2025

(54) METHOD AND APPARATUS FOR UPLINK/DOWNLINK TRANSMISSION/RECEPTION ON BASIS OF BEAM LINKAGE STATE IN WIRELESS COMMUNICATION SYSTEM

(71) Applicant: LG ELECTRONICS INC., Seoul (KR)

(72) Inventors: Jaehoon Chung, Seoul (KR); Kyuseok Kim, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/917,370

(22) PCT Filed: Apr. 5, 2021

(86) PCT No.: PCT/KR2021/004208
§ 371 (c)(1),
(2) Date: Oct. 6, 2022

(87) PCT Pub. No.: WO2021/206389
PCT Pub. Date: Oct. 14, 2021

(65) Prior Publication Data
US 2023/0164779 A1    May 25, 2023

(30) Foreign Application Priority Data

Apr. 6, 2020  (KR) .................. 10-2020-0041380

(51) Int. Cl.
*H04W 72/1273* (2023.01)
*H04W 16/28* (2009.01)
*H04W 72/23* (2023.01)

(52) U.S. Cl.
CPC ....... *H04W 72/1273* (2013.01); *H04W 16/28* (2013.01); *H04W 72/23* (2023.01)

(58) Field of Classification Search
CPC . H04W 72/1273; H04W 16/28; H04W 72/23; H04W 72/046; H04B 7/06968;
(Continued)

(56) References Cited

U.S. PATENT DOCUMENTS

| | | | |
|---|---|---|---|
| 2011/0243015 A1* | 10/2011 | Lim | H04L 5/0098 370/252 |
| 2019/0052344 A1* | 2/2019 | Kundargi | H04B 17/24 |

(Continued)

FOREIGN PATENT DOCUMENTS

| | | |
|---|---|---|
| CN | 108282198 | 7/2018 |
| JP | 2020506583 | 2/2020 |
| WO | 2020012662 | 1/2020 |

OTHER PUBLICATIONS

3rd Generation Partnership Project (3GPP), "Technical Specification Group Radio Access Network; NR; Physical layer procedures for data (Release 16)," 3GPP TS 38.214 V16.1.0, Mar. 2020, 152 pages.

(Continued)

*Primary Examiner* — Kiet Tang
(74) *Attorney, Agent, or Firm* — LEE, HONG, DEGERMAN, KANG & WAIMEY

(57) ABSTRACT

A method and an apparatus for uplink/downlink transmission and reception based on a beam linkage state in a wireless communication system are disclosed. A method for performing uplink transmission or downlink reception according to an embodiment of the present disclosure may comprise: receiving, from a base station (BS), information on a beam linkage state (BLS), wherein the BLS includes information on a mapping relation between reference transmission and reception and at least one target transmission (Continued)

and reception; receiving, from the BS, information on a first spatial parameter for the reference transmission and reception which is related to a specific BLS; and performing the uplink transmission or the downlink reception based on a second spatial parameter corresponding to the first spatial parameter.

17 Claims, 17 Drawing Sheets

(58) Field of Classification Search
CPC .. H04B 17/373; H04B 7/0695; H04B 7/0408; H04B 7/088; H04L 5/00; H04L 1/1812; H04L 5/0048
See application file for complete search history.

(56) References Cited

U.S. PATENT DOCUMENTS

2019/0239212 A1  8/2019  Wang et al.
2019/0393937 A1* 12/2019  Kim .................. H04W 72/23
2020/0077395 A1  3/2020  Guo

OTHER PUBLICATIONS

3rd Generation Partnership Project (3GPP), "Technical Specification Group Radio Access Network; NR; Radio Resource Control (RRC) protocol specification (Release 15)," 3GPP TS 38.331 V15.9.0, Mar. 2020, 537 pages.

Fraunhofer IIS et al., "Enhancements on UE multi-beam operation," 3GPP TSG-RAN WG1 Meeting #97, R1-1910432, Aug. 2019, 7 pages.

NTT DOCOMO, Inc., "Discussion on multi-beam enhancement," 3GPP TSG-RAN WG1 #98-bis, R1-1911185, Oct. 2019, 21 pages.

PCT International Application No. PCT/KR2021/004208, International Search Report dated Jul. 23, 2021, 4 pages.

Japan Patent Office Application No. 2020-554606, Office Action dated Mar. 11, 2025, 3 pages.

* cited by examiner

METHOD AND APPARATUS FOR UPLINK/DOWNLINK TRANSMISSION/RECEPTION ON BASIS OF BEAM LINKAGE STATE IN WIRELESS COMMUNICATION SYSTEM

CROSS-REFERENCE TO RELATED APPLICATIONS

This application is the National Stage filing under 35 U.S.C. 371 of International Application No. PCT/KR2021/004208, filed on Apr. 5, 2021, which claims the benefit of earlier filing date and right of priority to Korean Application No. 10-2020-0041380, filed on Apr. 6, 2020, the contents of which are all incorporated by reference herein in their entirety.

TECHNICAL FIELD

The present disclosure relates to a wireless communication system, and more particularly, to a method and apparatus for performing uplink/downlink transmission/reception based on a beam linkage state in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for performing uplink/downlink transmission/reception based on a beam linkage state.

An additional technical object of the present disclosure is to provide a method and an apparatus for configuring a beam linkage state candidate and activating or indicating a beam linkage state.

An additional technical object of the present disclosure is to provide a method and an apparatus for determining a spatial parameter to be applied to target transmission/reception associated with reference transmission/reception by a beam linkage state.

An additional technical object of the present disclosure is to provide a method and an apparatus for determining a timing for applying a spatial parameter for target transmission/reception associated with reference transmission/reception by a beam linkage state.

The technical objects to be achieved by the present disclosure are not limited to the above-described technical objects, and other technical objects which are not described herein will be clearly understood by those skilled in the pertinent art from the following description.

Technical Solution

A method of performing uplink transmission or downlink reception by a user equipment (UE) in a wireless communication system according to an aspect of the present disclosure may comprise: receiving, from a base station (BS), information on a beam linkage state (BLS), wherein the BLS includes information on a mapping relation between reference transmission and reception and at least one target transmission and reception; receiving, from the BS, information on a first spatial parameter for the reference transmission and reception which is related to a specific BLS; and performing the uplink transmission or the downlink reception based on a second spatial parameter corresponding to the first spatial parameter, for a specific target transmission and reception among the at least one target transmission and reception which is mapped to the reference transmission and reception related to the specific BLS.

A method of performing downlink transmission or uplink reception by a base station (BS) in a wireless communication system according to an additional aspect of the present disclosure may comprise: transmitting, to a user equipment (UE), information on a beam linkage state (BLS), wherein the BLS includes information on a mapping relation between reference transmission and reception and at least one target transmission and reception; transmitting, to the UE, information on a first spatial parameter for the reference transmission and reception which is related to a specific BLS; and performing the downlink transmission or the uplink reception based on a second spatial parameter corresponding to the first spatial parameter, for a specific target transmission and reception among the at least one target transmission and reception which is mapped to the reference transmission and reception related to the specific BLS.

Technical Effects

According to the present disclosure, a method and an apparatus for performing uplink/downlink transmission/reception based on a beam linkage state may be provided.

According to the present disclosure, a method and an apparatus for configuring a beam linkage state candidate and activating or indicating a beam linkage state may be provided.

According to the present disclosure, a method and an apparatus for determining a spatial parameter to be applied for target transmission/reception associated with reference transmission/reception by a beam linkage state may be provided.

According to the present disclosure, a method and an apparatus for determining a time point for applying a spatial parameter for target transmission/reception associated with reference transmission/reception by a beam linkage state may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
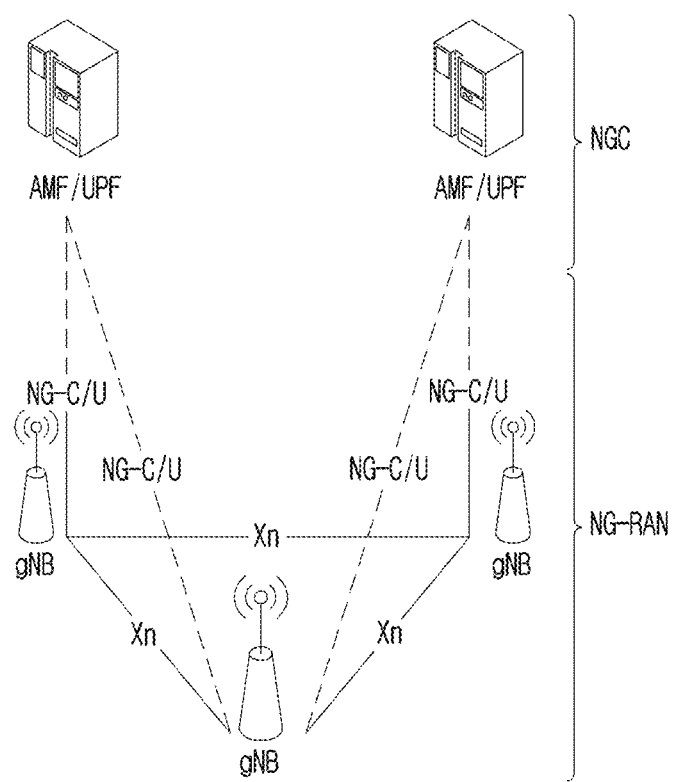
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
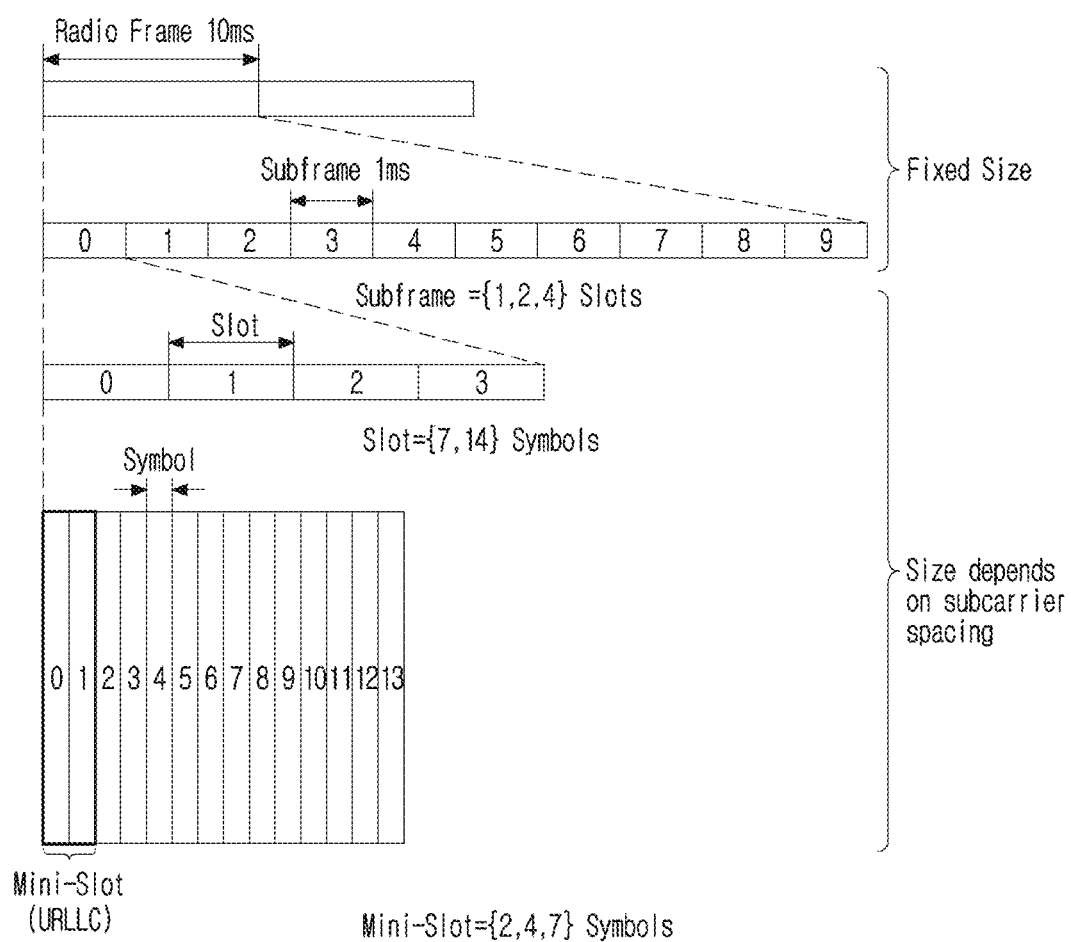
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW)

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration p, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
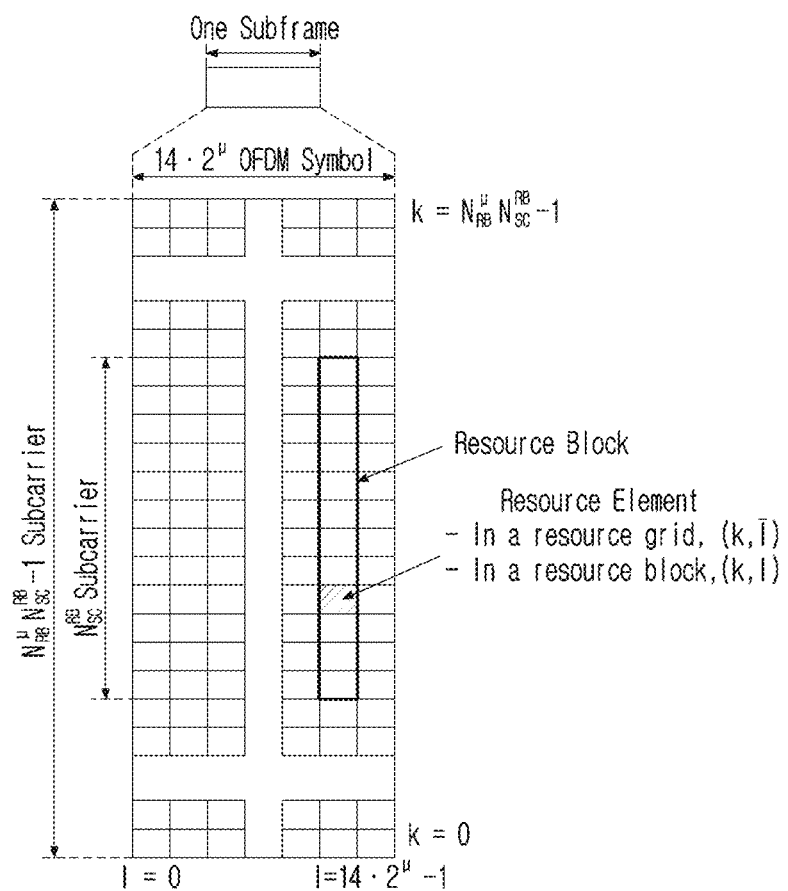
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k, l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k, l) is used. Here, l=0, . . . , $N_{symb}^{\mu}-1$. A resource element (k, l') for p and an antenna port p corresponds to a complex value, $a_{k,l'}^{(p,\mu)}$. When there is no risk of confusion or when a specific antenna port or numerology is not specified, indexes p and µ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration p is identical to 'point A'. A relationship between a common resource block number $n_{CRB}^{\mu}$ and a resource element (k, l) for a subcarrier spacing configuration µ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
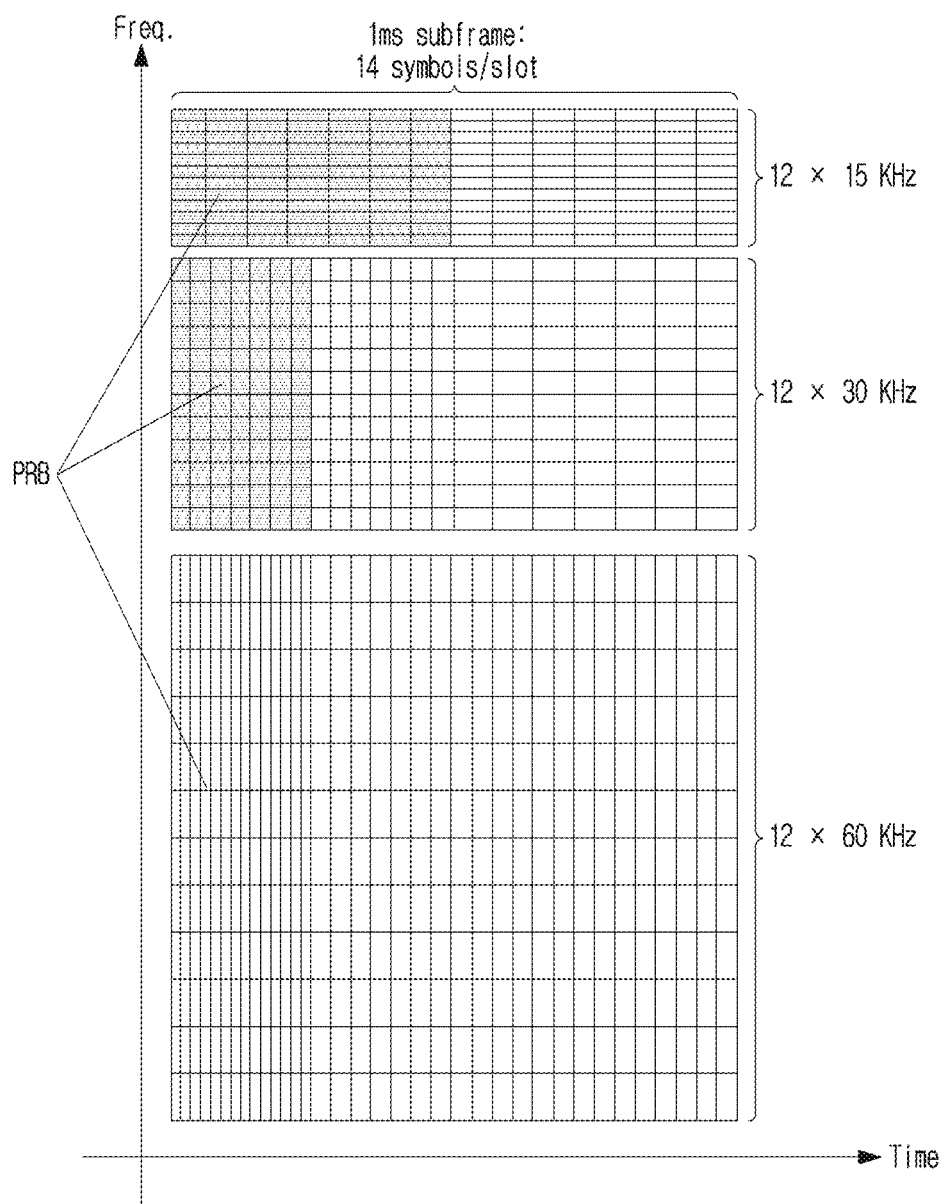
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
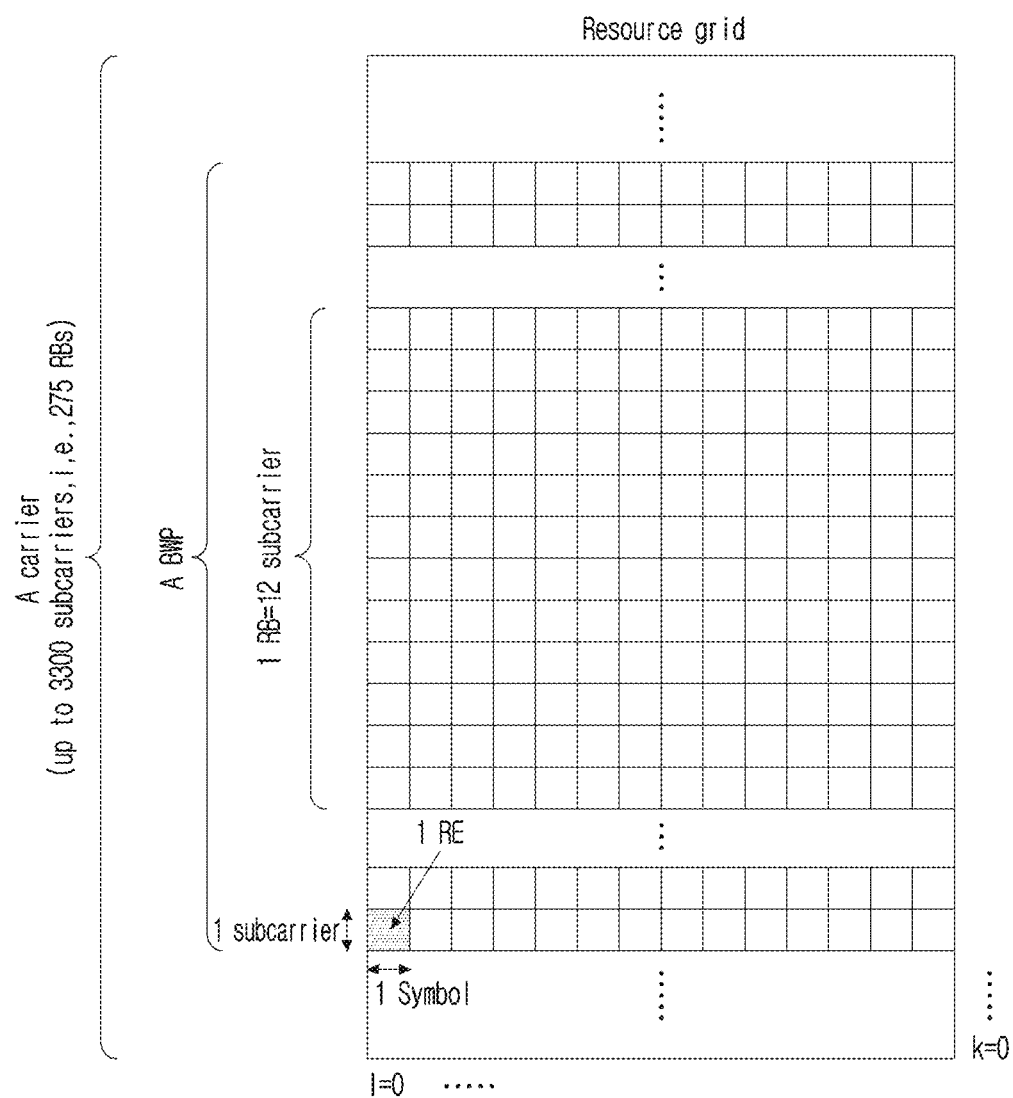
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
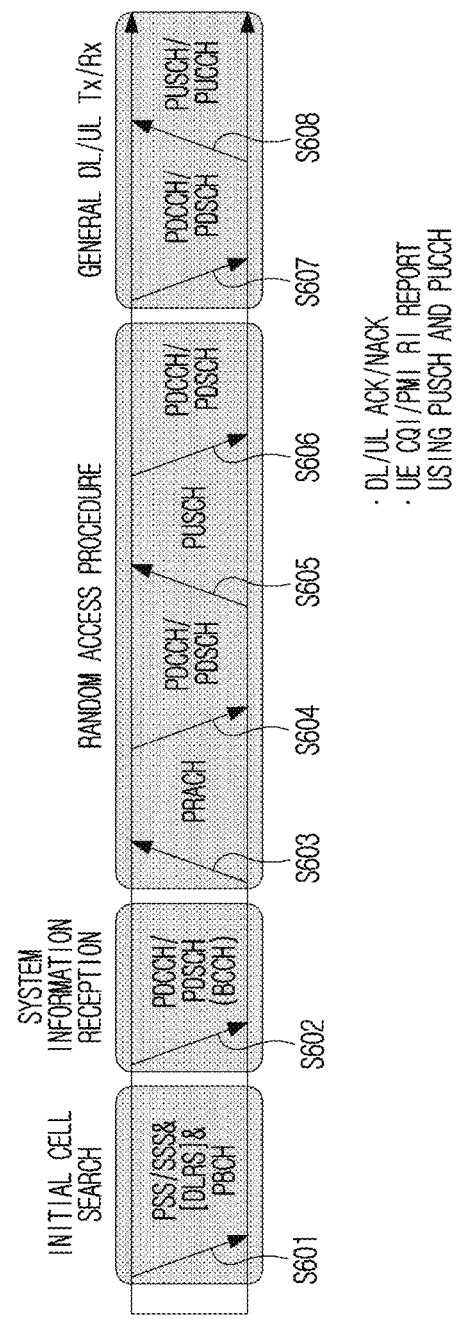
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Figure 7:
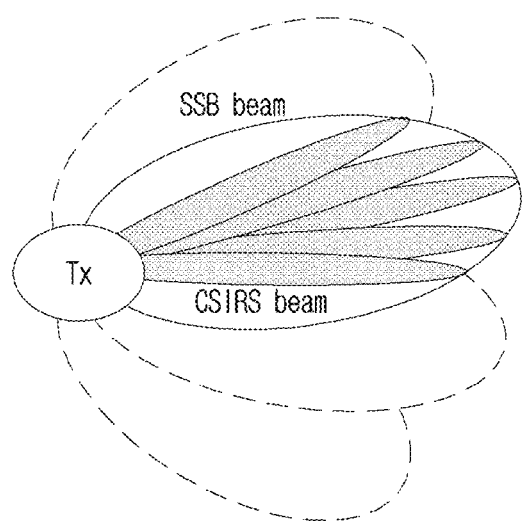
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
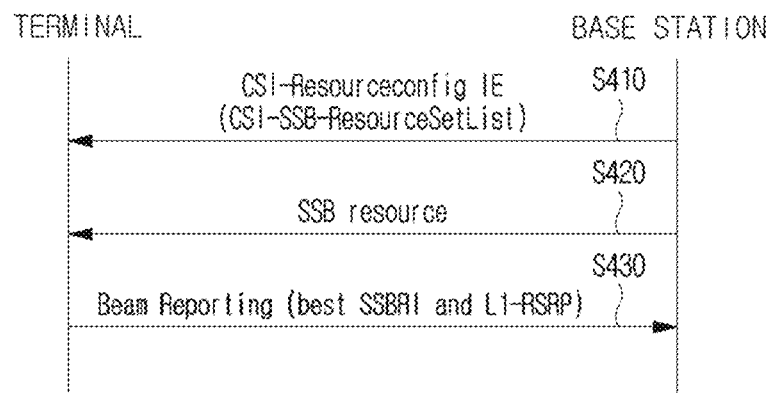
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

TABLE 6

```
ASN1START
TAG-CSI-RESOURCECONFIG-START
CSI-ResourceConfig ::=         SEQUENCE {
csi-ResourceConfigId           CSI-ResourceConfigId,
csi-RS-ResourceSetList         CHOICE {
nzp-CSI-RS-SSB                 SEQUENCE {
nzp-CSI-RS-ResourceSetList     SEQUENCE                    (SIZE
(1..maxNrofNZP-CSI-RS-ResourceSetsPerConfig) )   OF   NZP-CSI-RS-
ResourceSetId OPTIONAL,
csi-SSB-ResourceSetList        SEQUENCE                    (SIZE
(1..maxNrofCSI-SSB-ResourceSetsPerConfig) )      OF   CSI-SSB-
ResourceSetIdOPTIONAL
},
csi-IM-ResourceSetList         SEQUENCE                    (SIZE
(1..maxNrofCSI-IM-ResourceSetsPerConfig) )       OF   CSI-IM-
ResourceSetId
},
bwp-Id                         BWP-Id,
resourceType                   ENUMERATED    {    aperiodic,
semiPersistent, periodic },
...
}
TAG-CSI-RESOURCECONFIGTOADDMOD-STOP
-- ASN1STOP
```

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier) (s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, ... }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS info is not configured, a CSI-RS is used for beam management. ii) when a repetition parameter is not configured and TRS info is configured, a CSI-RS is used for a TRS (tracking reference signal). iii) when a repetition parameter is not configured and TRS info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
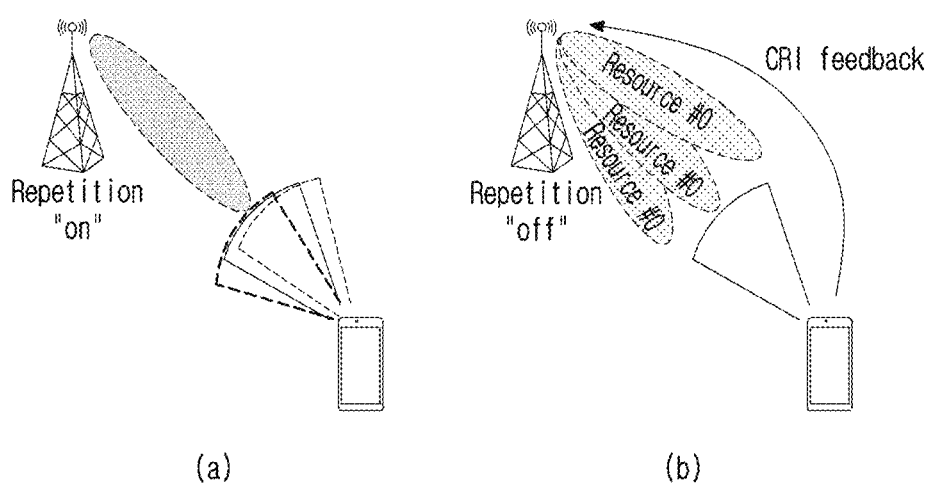
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
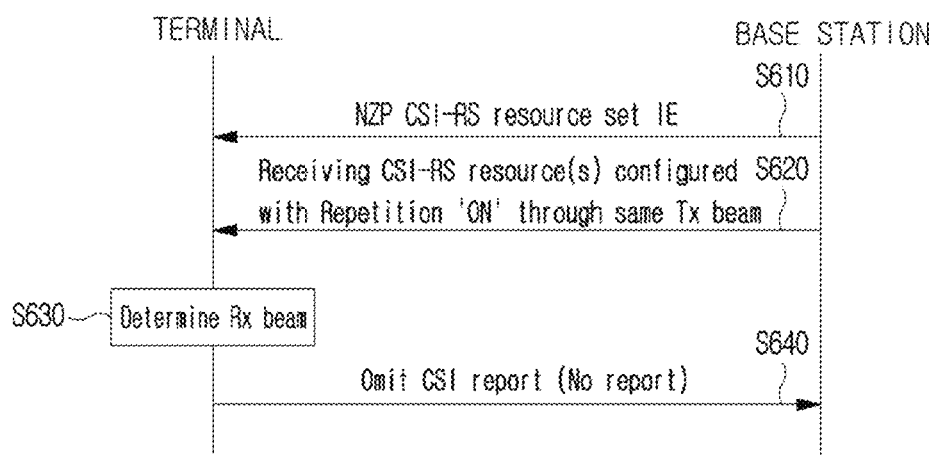
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
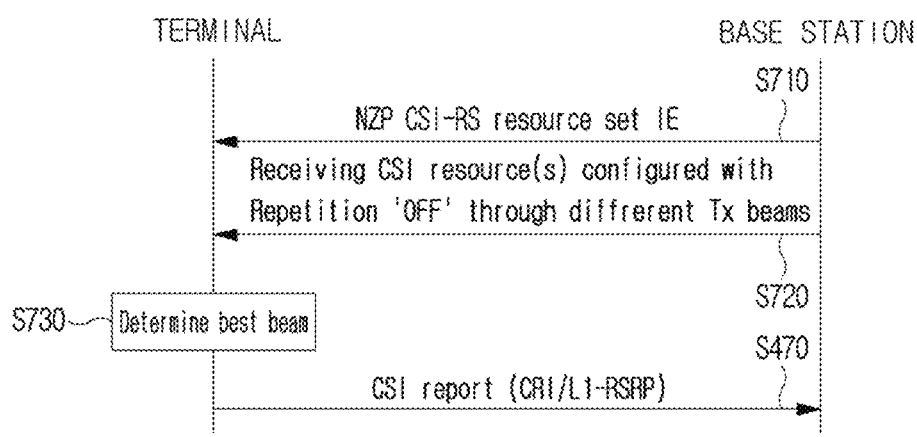
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
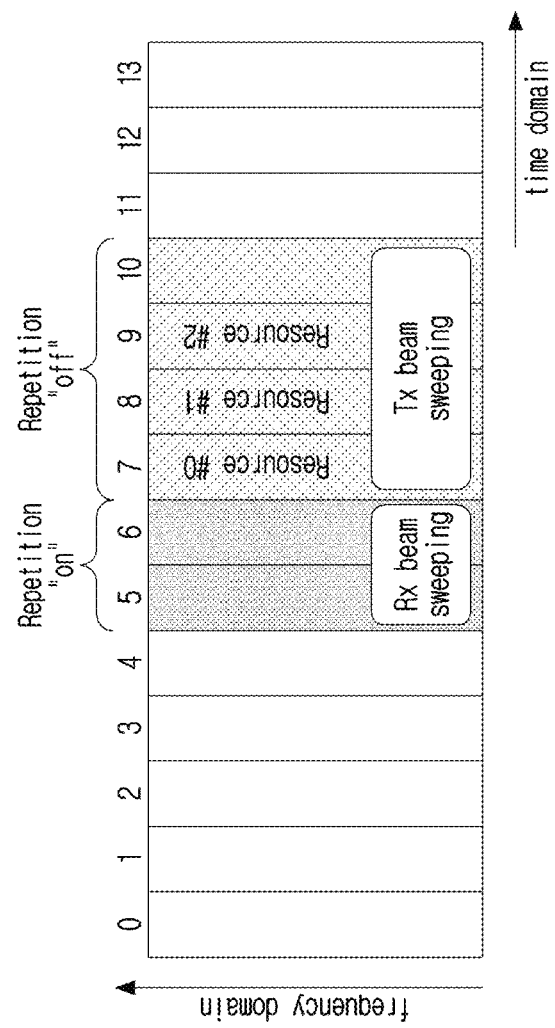
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
ASN1START
TAG-TCI-STATE-START
TCI-State ::=           SEQUENCE {
tci-StateId             TCI-StateId,
qcl-Type1               QCL-Info,
qcl-Type2               QCL-Info
    OPTIONAL,           -- Need R
...
}
QCL-Info ::=            SEQUENCE {
cell                    ServCellIndex
    OPTIONAL,           -- Need R
bwp-Id                  BWP-Id
    OPTIONAL,   -- Cond CSI-RS-Indicated
referenceSignal         CHOICE {
csi-rs                  NZP-CSI-RS-ResourceId,
ssb                     SSB-Index
},
qcl-Type                ENUMERATED {typeA, typeB, typeC,
typeD},
...
}
TAG-TCI-STATE-STOP
-- ASN1STOP
```

In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
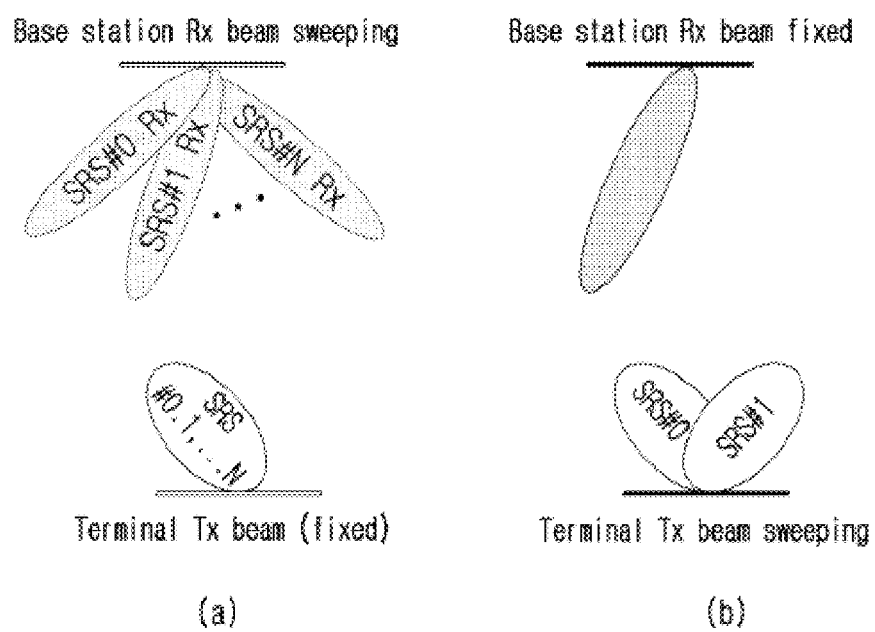
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
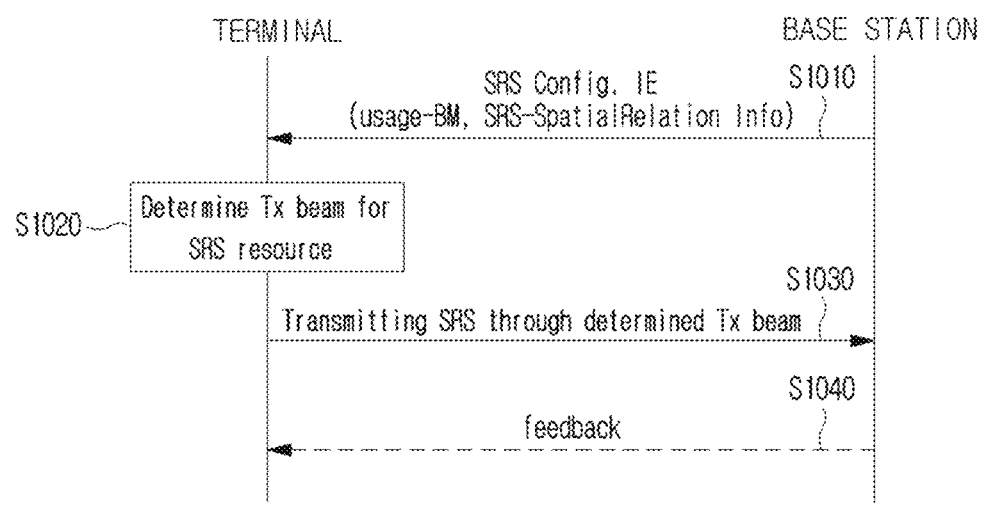
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config ::=                  SEQUENCE {
srs-ResourceSetToReleaseList        SEQUENCE
(SIZE(1..maxNrofSRS-ResourceSets) ) OF SRS-ResourceSetId
    OPTIONAL, -- Need N
srs-ResourceSetToAddModList         SEQUENCE
(SIZE(1..maxNrofSRS-ResourceSets) ) OF SRS-ResourceSet
    OPTIONAL, -- Need N
srs-ResourceToReleaseList           SEQUENCE
(SIZE(1..maxNrofSRS-Resources) ) OF SRS-ResourceId
    OPTIONAL, -- Need N
srs-ResourceToAddModList            SEQUENCE
(SIZE(1..maxNrofSRS-Resources) ) OF SRS-Resource
    OPTIONAL, -- Need N
tpc-Accumulation                ENUMERATED {disabled}
                                    OPTIONAL, -- Need S
...
}
SRS-ResourceSet ::=             SEQUENCE {
srs-ResourceSetId                   SRS-ResourceSetId,
srs-ResourceIdList                  SEQUENCE
(SIZE(1..maxNrofSRS-ResourcesPerSet) ) OF SRS-ResourceId
    OPTIONAL, -- Cond Setup
resourceType                    CHOICE {
aperiodic                       SEQUENCE {
aperiodicSRS-ResourceTrigger        INTEGER  (1..maxNrofSRS-
TriggerStates-1),
csi-RS                              NZP-CSI-RS-ResourceId
                                OPTIONAL, -- Cond NonCodebook
slotOffset                          INTEGER (1..32)
                                OPTIONAL, -- Need S
...
},
```

TABLE 8-continued

```
semi-persistent                    SEQUENCE {
associatedCSI-RS                       NZP-CSI-RS-ResourceId
                               OPTIONAL, -- Cond NonCodebook
...
},
periodic                           SEQUENCE {
associatedCSI-RS                       NZP-CSI-RS-ResourceId
                               OPTIONAL, -- Cond NonCodebook
...
}
},
usage                          ENUMERATED   {beamManagement,
codebook, nonCodebook, antennaSwitching},
alpha                              Alpha
                               OPTIONAL, -- Need S
p0                                 INTEGER (-202..24)
                               OPTIONAL, -- Cond Setup
pathlossReferenceRS                CHOICE {
ssb-Index                          SSB-Index,
csi-RS-Index                       NZP-CSI-RS-ResourceId
SRS-SpatialRelationInfo ::=        SEQUENCE {
servingCellId                      ServCellIndex
    OPTIONAL, -- Need S
referenceSignal                    CHOICE {
ssb-Index                          SSB-Index,
csi-RS-Index                       NZP-CSI-RS-ResourceId,
srs                                SEQUENCE {
resourceId                         SRS-ResourceId,
uplinkBWP                          BWP-Id
}
}
}
SRS-ResourceId ::=                 INTEGER
(0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelationInfo' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfigType' is configured as 'periodic':
 i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
 ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or
 iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).
 i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
 ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
 iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).
  QCL-TypeC with a SS/PBCH block, and if applicable, QCL-TypeD with the same SS/PBCH block, or
  QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).
  QCL-TypeA with a CSI-RS resource of configured NZP-CSI-RS-ResourceSet including a higher layer parameter trs-Info, and if applicable, QCL-TypeD with the same CSI-RS resource, or
  QCL-TypeA with a CSI-RS resource of configured NZP-CSI-RS-ResourceSet including a higher layer parameter trs-Info, and if applicable, QCL-TypeD with a SS/PBCH block, or
  QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
  when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type (s).

- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeC with a SS/PBCH block, and if applicable, QCL-TypeD with the same SS/PBCH block.

For a DMRS of a PDCCH, UE may expect a TCI state to indicate one of the following QCL type(s).

- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Uplink/Downlink Transmission and Reception Based on a Beam Linkage State

Hereinafter, various examples of the present disclosure for uplink/downlink transmission and reception based on a beam linkage state will be described.

A spatial parameter (or a parameter related to beam transmission/reception) related to downlink transmission/reception may include QCL information applied to a physical channel through which downlink control information or data is transmitted and received or assumed by the terminal. The QCL information may include QCL reference signal (RS) information, and the QCL RS information may be configured for each QCL type (e.g., QCL type A/B/C/D). For example, downlink control information (DCI) may be transmitted and received through PDCCH, and a spatial parameter related to DCI transmission/reception may include QCL reference information for PDCCH DMRS antenna port(s), TCI state information, etc. In addition, downlink data may be transmitted and received through PDSCH, and a spatial parameter related to downlink data transmission/reception may include QCL reference information for PDSCH DMRS antenna port(s), TCI state information, etc.

However, in the present disclosure, the term spatial parameter is not limited to QCL information and may include a spatial parameter applied to uplink transmission (e.g., spatial relation info related to an uplink transmission beam). For example, uplink control information (UCI) may be transmitted/received through PUCCH and/or PUSCH, and a spatial parameter related to UCI transmission/reception may include PRI (resource indicator) and spatial relation info related to PUCCH/PUSCH transmission/reception, or QCL reference RS related to thereof, etc.

In addition, a spatial parameter may be separately set for downlink or uplink, or may be configured integrally for downlink and uplink.

In addition, a spatial parameter may also be defined or configured as a spatial parameter set including at least one spatial parameter. Hereinafter, in order to simplify the description, at least one spatial parameter is collectively referred to as a spatial parameter.

In order for the base station to configure/indicate the PDCCH reception spatial parameter (or reception beam) of the terminal, it may configure/update the TCI state ID for each of one or more CORESETs. The TCI state configured for CORESET may indicate QCL reference information (e.g., QCL type D related information) for PDCCH DMRS antenna port(s) transmitted through the corresponding CORESET. That is, QCL reference information (e.g., QCL Type D information) of the TCI state ID configured/updated for each CORESET may correspond to the PDCCH reception beam of the terminal.

In the case of a spatial parameter (or reception beam) configuration/indication for PDSCH reception, a TCI field may be included in the PDCCH DCI for scheduling the corresponding PDSCH. The TCI status ID (or TCI codepoint) indicated by the TCI field in DCI may indicate QCL reference information (e.g., QCL type D related information) for the PDSCH DMRS antenna port(s).

Configuring/indicating a spatial parameter for PDSCH reception may be dynamically performed through DCI, since the spatial parameter indicated through DCI is limited to spatial parameter candidates which are preconfigured through higher layer signaling (e.g., RRC/MAC CE), higher layer signaling is required to change/update a spatial parameter for PDSCH reception. Since a spatial parameter for PDCCH reception is based on CORESET configuration, RRC reconfiguration or MAC CE message transmission for CORESET configuration/update is required to configure/indicate the spatial parameter for PDCCH reception. In addition, when spatial parameter information (e.g., TCI field) is not included in the DCI for scheduling the PDSCH, the spatial parameter for PDSCH reception may be applied based on the spatial parameter configured for the CORESET in which the DCI is monitored. In addition, even if spatial parameter information (e.g., TCI field) is included in the DCI for scheduling the PDSCH, when a time interval (or scheduling offset) between a timing at which a DCI/PDCCH scheduling a PDSCH is received and a timing at which the corresponding PDSCH is received is less than or equal to a predetermined threshold, the spatial parameter for PDSCH reception may be applied based on the default spatial parameter (e.g., the TCI state associated with the CORESET or SS set having the lowest identifier in the latest slot monitored by the terminal). In this way, if the change/update of the PDCCH/PDSCH spatial parameter/receive beam is performed through higher layer signaling (e.g., RRC/MAC CE), there is a disadvantage in that not only flexibility is reduced but also unnecessary signaling overhead according to the change/update exists.

In order to solve such a problem, in the following examples, while minimizing signaling overhead, UL/DL transmission/reception based on a beam linkage state (BLS) will be described.

In the following description, spatial parameter or spatial relation info may mean including RS information/QCL related (or reference) RS information/QCL parameters, or the like for spatial related assumption for data/signal transmitted/received through UL channel/DL channel, or may be expressed by being mixed/replaced by the above terms.

In the following examples, the meaning of using/applying/mapping a specific spatial parameter (or TCI state or TCI) when transmitting/receiving data/DCI/UCI for a certain frequency/time/spatial resource is that in the case of DL estimating a channel from DMRS using the QCL type and QCL RS indicated by the corresponding spatial parameter in corresponding frequency/time/spatial resources and receiving/demodulating data/DCI (e.g., PDSCH/PDCCH) with the estimated channel and in the case of UL transmitting/modulating DMRS and data/UCI (e.g., PUSCH/PUCCH) using transmission beam and/or transmission power indicated by the corresponding spatial parameter in corresponding frequency/time/spatial resources.

Figure 15:
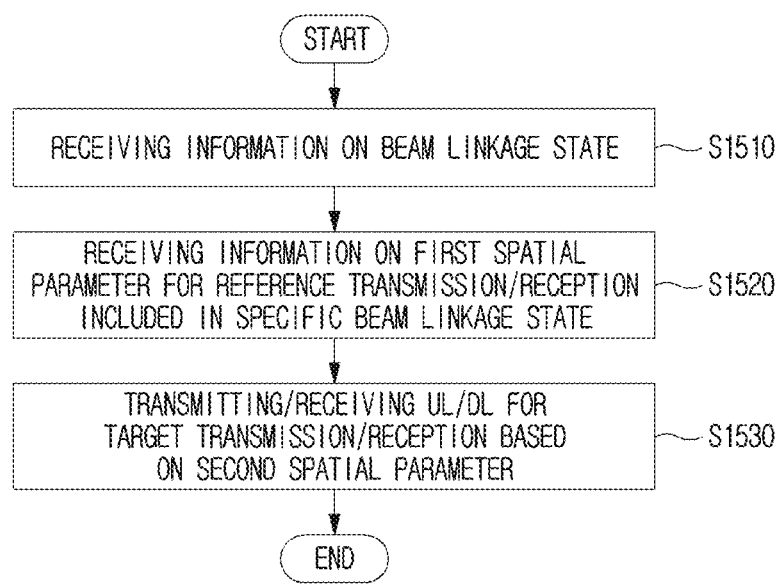
FIG. 15 is a flowchart illustrating a method of performing uplink transmission or downlink reception by a terminal based on a beam linkage state according to the present disclosure.

FIG. 15 is a flowchart illustrating a method of performing uplink transmission or downlink reception by a terminal based on a beam linkage state according to the present disclosure.

In step S1510, the terminal may receive, from a base station, information on a beam linkage state (BLS).

For example, the terminal may receive configuration information for at least one candidate of BLS from the base station. The configuration information may be configured for the terminal through higher layer (e.g., RRC) signaling.

The BLS may include information on a mapping relation between at least one reference transmission/reception and at least one target transmission/reception. For example, each BLS candidate may define a mapping relation between one reference transmission/reception and at least one target transmission/reception. The BLS may define a relation in which a first spatial parameter for reference transmission/reception and a second spatial parameter for target transmission/reception are linked (e.g., a second spatial parameter is changed according to a change of the first spatial parameter).

Here, the second spatial parameter may be the same as the first spatial parameter or a spatial parameter corresponding to the first spatial parameter. For example, the reception spatial parameter (or a reception beam) of the terminal and the transmission spatial parameter (or a transmission beam) of the terminal may have a correspondence according to the implementation of the transmission/reception filter of the terminal. Alternatively, the first reception spatial parameter (or a reception beam) of the terminal may have a correspondence with the second reception spatial parameter (or reception beam), and the first transmission spatial parameter (or a transmission beam) of the terminal may have a correspondence with the second transmission spatial parameter (or a transmission beam).

For example, the correspondence between the first spatial parameter and second spatial parameter may be predefined/predetermined according to a predetermined rule, preconfigured by a signaling exchange between the base station and the terminal, or predefined according to the implementation of the terminal. Accordingly, a detailed correspondence between spatial parameters is not defined in the present disclosure, and various arbitrary correspondences may be applied. That is, in the examples of the present disclosure, it is assumed that the correspondence between the first spatial parameter and second spatial parameter is known in advance to the terminal and/or the base station.

In addition, the terminal may receive information on a specific BLS that is activated or valid among at least one candidate of the BLS from the base station.

For example, the information on a specific BLS may be indicated to the UE through higher layer (e.g., MAC CE) or lower layer (e.g., DCI) signaling.

Accordingly, the terminal may determine target transmission/reception(s) mapped to the reference transmission/reception based on a specific BLS. For example, the reference transmission/reception may be a first UL/DL reference signal (RS)/channel (CH), and the target transmission/reception may be a second UL/DL RS/CH. For example, the DL RS/CH may be PDCCH, PDSCH, SSB, CSI-RS, or the like, and the UL RS/CH may be PUCCH, PUSCH, SRS, or the like.

In step S1520, the terminal may receive information on the first spatial parameter from the base station for the reference transmission/reception included in the specific BLS. The first spatial parameter may be indicated to the terminal through higher layer/lower layer signaling. In addition, the first spatial parameter may be pre-configured/indicated for the terminal.

In step S1530, the terminal may perform UL transmission or DL reception for target transmission/reception based on the second spatial parameter.

For example, the terminal may determine target transmission/reception associated with reference transmission/reception based on a specific BLS, and may determine a second spatial parameter corresponding to a first spatial parameter for reference transmission/reception based on the correspondence between spatial parameters.

According to the example of FIG. 15, unlike the method of separately indicating the existing DL/UL spatial parameters by RRC reconfiguration/MAC CE message/spatial relation info/TCI state through DCI, it is possible to indicate spatial parameters in correlation with each other applied to UL/DL transmission/reception, the efficiency and flexibility of configuring/indicating a spatial parameter can be increased while reducing signaling overhead.

Specifically, according to the above-described DL BM and PDCCH reception beam configuration/update method of the terminal, RRC reconfiguration/MAC CE message transmission is required to update TCI state information of CORESET configuration, and PDSCH reception beam configuration/update The same operation is required for the purpose of In addition, in the PUCCH/PUSCH beam indication method, RRC reconfiguration/MAC CE message transmission is required to update spatial relation info for beam change. Such a conventional beam change procedure has a problem in that the flexibility of the uplink/downlink transmission/reception beam change is low, and the signaling overhead for beam update is high.

In the present disclosure, in order to solve these problems, based on DL reception beam information (e.g., QCL related information) or UL transmission beam information as a reference, while minimizing signaling overhead, various methods for dynamically changing the transmission/reception beam of the DL RS/CH will be described.

That is, a linkage relation to the target RS/CH(s) may be configured with respect to a reference RS/CH, and the linkage relation and the linkage range may be dynamically indicated through DCI. This means that by indicating information on a beam (or spatial parameter) to be used for UL/DL transmission/reception by using TCI state/spatial relation info, association flexibility for transmission/reception beam determination can be increased. In addition, dynamic transmission/reception beam instruction/determination is possible through beam change/update through DCI based on the UL/DL beam linkage relation, and the effect of reducing the DCI payload can also be achieved by omitting the field related to beam configuration/indication in DCI according to specific beam linkage.

In order to prevent collision with the existing UL/DL transmission/reception beam configuration/update method not based on BLS, an enabler indicating whether to apply the method based on BLS may be defined. That is, when explicitly indicated through an enabler, the examples of the present disclosure may be applied, and in other cases, a method not based on the existing BLS may be applied.

For example, 'beam_linkage_enabler' for whether to apply a beam configuration/update operation based on BLS may be configured as an RRC parameter. When the corresponding enabler is 'OFF', the existing (i.e., not based on BLS) operation may be followed, and when the corresponding enabler is 'ON', examples of the present disclosure (i.e., BLS-based embodiment 1/2)/3/4, etc.) may be activated.

Hereinafter, various examples of the present disclosure for BLS-based UL/DL transmission/reception will be described.

Embodiment 1

The base station may configure BLS information to the terminal through higher layer (e.g., RRC, etc.) signaling.

BLS may include a linkage relation between a spatial parameter (i.e., beam) of reference transmission/reception (i.e., a specific RS/CH to be a reference) and target transmission/reception (i.e., target RS(s)/CH(s)) to be changed based on this. Accordingly, based on a spatial domain filter or beam applied/used in reception or transmission of a specific RS/CH as a reference, the spatial domain filter(s) or the beam applied/used to transmission or reception of another (i.e., target) RS(s)/CH(s) may be changed/updated.

For example, in an operation not based on BLS, information related to a PDSCH reception beam and an ACK/NACK PUCCH transmission beam for the corresponding PDSCH may be indicated through the TCI field and the PRI field of DCI format 1_1, respectively. Alternatively, based on the BLS, for the ACK/NACK PUCCH transmission beam determination, a linkage relation based on the PDSCH reception beam indication may be configured/indicated. Accordingly, for ACK/NACK PUCCH transmission, a spatial domain Tx filter corresponding to a spatial domain Rx filter used for PDSCH reception may be applied.

Accordingly, the BLS may configure a range in which the spatial parameter/beam for target transmission/reception is indicated/applied based on the spatial parameter/beam for reference transmission/reception for each state. In addition, step(s) applied for a specific RS/CH may be configured in detail. For example, in the case of PUCCH, the BLS may be configured to apply the spatial parameter/beam change/update to all configured PUCCHs and/or may be configured to limitedly apply the spatial parameter/beam change/update only to a specific PUCCH (e.g., SR PUCCH/ACK/NACK PUCCH/CSI PUCCH, etc.). Specific examples thereof will be described in detail in embodiments 2 and 3.

As an additional example, in a method of configuring BLS, only a set for target transmission/reception (without specifying reference transmission/reception) may be configured.

As an additional example, a linkage relation for a target transmission/reception set may be configured for each spatial parameter/spatial domain filter/beam applied/used for reference transmission/reception. For example, if it is assumed that two sets for target transmission/reception are configured as 'target set A' and 'target set B', BLS may be expressed as shown in Example of Table 9 below. In the example of Table 9, for clarity of explanation, it is assumed that two target sets are configured, but this does not limit the technical scope of the present disclosure, and examples of the present disclosure may be applied even when three or more target sets are configured.

TABLE 9

| BLS | Reference | Target |
| --- | --- | --- |
| #1 | PUCCH | Target set A |
|  | PDSCH | Target set B |
| #2 | PDSCH | Target set A |
|  | PUSCH | Target set B |

In the example of Table 9, Target set A may be {PUSCH, CSI PUCCH, PDCCH}, Target set B may be {SR PUCCH}. For example, if BLS #1 is activated/indicated among BLS candidates BLS #1 and BLS #2, a second spatial parameter for PUSCH/CSI PUCCH/PDCCH that is target transmission/reception may be determined based on a first spatial parameter for PUCCH which is reference transmission/reception, and a second spatial parameter for SR PUCCH, which is target transmission/reception, may be determined based on a first spatial parameter for PDSCH, which is reference transmission/reception. In the above examples, BLS configuration/indication may be performed through MAC CE. For example, among one or more BLS candidates, a specific ID (or index) for BLS may be indicated through a MAC CE message. The specific BLS indicated through the MAC CE may change/update a spatial parameter/beam for UL/DL transmission and reception based on the BLS indicated by the MAC CE, after a predetermined time (e.g., applicable timing), until a BLS update through the new MAC CE is indicated. For example, the predetermined time may be defined as 3 msec after ACK transmission, and specific examples thereof will be described in Embodiment 4.

In this way, when BLS is indicated through MAC CE, the beam linkage field of DCI may be deactivated, or DCI may be configured by omitting a specific field(s) in the DCI format according to the beam linkage method.

As a further example, BLS configuration/indication may be more dynamically performed through DCI. Specific examples thereof will be described in embodiments 2 and 3.

Embodiment 2

This embodiment is about an example of changing/updating a second spatial parameter (e.g., spatial domain transmission parameter/spatial domain reception parameter) for at least one UL/DL RS/CH that is a target transmission/reception, when the reference transmission/reception is a DL RS/CH (e.g., PDCCH or PDSCH) and the first spatial parameter is indicated through the TCI state.

As a specific example, based on the PDCCH/PDSCH reception beam indication, transmission/reception beams of other RS(s)/CH(s) may be changed/updated according to the BLS. Unlike the MAC CE-based BLS configuration/indication operation described in Embodiment 1, in the examples of Embodiment 2, the BLS field of DCI may indicate the BLS ID based on a code point, when 'beam_linkage_enabler' is ON. That is, whether a specific BLS is activated may be indicated by the BLS field of the DCI.

For example, the TCI state indicated through DCI for PDSCH scheduling may indicate a specific TCI state ID associated with the TCI codepoint indicated by the TCI field of DCI format 1_1. Through the DL reference RS(s) and QCL information of the specific TCI state ID (i.e., the TCI state ID associated with the PDSCH), the terminal may change/update the reference RS of spatial relation info applied to the specific (target) UL RS/CH transmission as a DL reference RS (or the reference RS corresponding to the DL reference RS) (of the TCI state ID associated with the PDSCH), based on the BLS. In addition, the terminal may change/update the TCI state/spatial Rx parameter of a specific (target) DL RS/CH to follow the DL reference RS/QCL assumption (of the TCI state ID associated with the PDSCH) based on the BLS.

For example, the BLS for the transmission/reception beam determination of RS(s)/CH(s) based on the PDSCH reception beam may be defined as in the example of Table 10. The examples in Table 10 are only for clarity of explanation, and do not limit the technical scope of the present disclosure. Therefore, the BLS may be defined by a rule different from the example in Table 10.

Referring to Table 10, the linkage between the PDSCH, which is the reference transmission/reception, and the PUCCH/PUSCH/PDCCH, which is the target transmission/reception, may be expressed as 0 (i.e., not linked) and 1 (i.e., linked).

TABLE 10

| BLS | PDSCH | ACK/NACK PUCCH | All configured PUCCH | PUSCH | PDCCH |
|---|---|---|---|---|---|
| #1 | 1 | 1 | 0 | 0 | 0 |
| #2 | 1 | 0 | 1 | 0 | 0 |
| #3 | 1 | 0 | 0 | 1 | 0 |
| #4 | 1 | 0 | 0 | 0 | 1 |
| #5 | 1 | 1 | 0 | 1 | 0 |
| #6 | 1 | 1 | 0 | 0 | 1 |
| #7 | 1 | 0 | 1 | 1 | 0 |
| #8 | 1 | 0 | 1 | 0 | 1 |
| #9 | 1 | 1 | 0 | 1 | 1 |
| #10 | 1 | 0 | 1 | 1 | 1 |

For example, when BLS #5 is indicated through a specific field (e.g., BLS field) of DCI (e.g., DCI format 1_1), for a transmission beam of ACK/NACK PUCCH and a transmission beam of PUSCH (i.e., the second spatial parameter for target transmission/reception), a spatial domain Tx filter corresponding to a spatial domain filter by beam indication information (e.g., TCI field) for PDSCH reception (i.e., the first spatial parameter for reference transmission/reception) may be applied. Here, the PRI field for indicating the spatial parameter for the ACK/NACK PUCCH in the corresponding DCI (e.g., DCI format 1_1) may be omitted. Accordingly, it can be expected to improve the efficiency of the uplink data channel and the reliability of the ACK/NACK PUCCH by utilizing the high channel quality in the PDSCH reception beam direction.

Since target transmission/reception associated with reference transmission/reception is different for each BLS, the degree and effect of payload reduction may be different. Meanwhile, the spatial parameter/beam indication operation for target transmission/reception is simplified, and both the TCI state and spatial relation info may be utilized without distinguishing the target transmission/reception by UL/DL, so that association flexibility can be greatly improved.

In Table 10, ACK/NACK PUCCH has been described as an example, but since various types of PUCCH exist according to their purpose/usage, the PUCCH in which the linkage relation is defined by the BLS is not limited to the ACK/NACK PUCCH. For example, a linkage relation for PUCCH type A and PUCCH type B may be defined by BLS. PUCCH type(s) may be pre-defined or configured to be explicitly distinguished according to a predetermined criterion. For example, the PUCCH type may be distinguished based on the usage/contents/format/whether dedicated PUCCH or not of the PUCCH, and the like.

For example, when types are distinguished based on the PUCCH usage, TypeA may correspond to a PUCCH for scheduling request (SR)/HARQ-ACK/CSI transmission, and TypeB may correspond to a PUCCH for BFRQ (beam failure recovery request).

For example, when types are distinguished based on the PUCCH format, TypeA may correspond to short PUCCH (e.g., PUCCH formats 0 and 2), and TypeB may correspond to long PUCCH (e.g., PUCCH format 1, 3, 4).

For example, if types are distinguished based on whether dedicated PUCCH or not, TypeA may correspond to a terminal common (or non-dedicated) PUCCH for HARQ-ACK for Msg4 (i.e., contention resolution message) in the RACH procedure, and TypeB may correspond to a dedicated (or UE-specific) PUCCH.

This criterion for distinguishing PUCCH may also be applied to the BLS of embodiment 3, which will be described below.

That is, reference transmission/reception and target transmission/reception defined by BLS may be distinguished in units of RS/CH or additionally in units of types of RS/CH.

Embodiment 3

This embodiment is about an example of changing/updating a second spatial parameter (e.g., spatial domain transmission parameter/spatial domain reception parameter) for at least one UL/DL RS/CH that is target transmission/reception, when the reference transmission/reception is UL RS/CH (e.g., PUCCH or PUSCH) and the first spatial parameter is indicated through spatial relation info.

As a specific example, based on the PUCCH/PUSCH transmission beam indication, the transmission/reception beam of other RS(s)/CH(s) may be changed/updated according to the BLS. Unlike the MAC CE-based BLS configuration/indication operation described in Embodiment 1, in the examples of Embodiment 3, when 'beam_linkage_enabler' is ON, the BLS field of DCI may indicate the BLS ID based on a code point. That is, whether a specific BLS is activated may be indicated by the BLS field of the DCI.

For example, an SRS resource indicator (SRI) indicated through DCI for PUSCH scheduling may be defined based on a codebook (CB) and a non-codebook (non-codebook). For example, in the case of the CB-based scheme, a PUSCH is transmitted based on 1-bit SRI, transmit precoding matrix indicator (TPMI), and transmit rank indicator (TRI) fields in DCI format 0_1. In addition, in the case of the non-CB based method, up to four 1-port SRS resources may be transmitted to the base station as a corresponding beam of each spatial relation info, and the base station receiving this may indicate to the terminal SRI(s) to be applied to PUSCH transmission through DCI. Therefore, in the case of the non-CB-based scheme, when a beam to be applied/used for target transmission/reception is selected as a beam corresponding to the SRI based on the BLS among a plurality of SRIs, the SRI corresponding beam may be selected based on a rule agreed between the base station and the terminal, or a beam corresponding to a specific SRI (e.g., first SRI or last SRI) indicated by the base station through DCI may be selected.

For example, the BLS for the transmission/reception beam determination of RS(s)/CH(s) based on the PUSCH reception beam may be defined as in the example of Table 11. The examples in Table 11 are only for clarity of explanation, and do not limit the technical scope of the present disclosure. Accordingly, the BLS may be defined by a rule different from the example in Table 11.

Referring to Table 11, whether the linkage between the PUSCH, which is the reference transmission/reception, and the PUCCH/PDSCH/PDCCH, which is the target transmission/reception, is or not may be expressed as 0 (i.e., not linked) and 1 (i.e., linked).

TABLE 11

| BLS | PUSCH | SR PUCCH | All configured PUCCH | PDSCH | PDCCH |
|---|---|---|---|---|---|
| #1 | 1 | 1 | 0 | 0 | 0 |
| #2 | 1 | 0 | 1 | 0 | 0 |
| #3 | 1 | 0 | 0 | 1 | 0 |
| #4 | 1 | 0 | 0 | 0 | 1 |
| #5 | 1 | 1 | 0 | 1 | 0 |
| #6 | 1 | 1 | 0 | 0 | 1 |
| #7 | 1 | 0 | 1 | 1 | 0 |
| #8 | 1 | 0 | 1 | 0 | 1 |
| #9 | 1 | 1 | 0 | 1 | 1 |
| #10 | 1 | 0 | 1 | 1 | 1 |

For example, when BLS #6 is indicated through a specific field (e.g., BLS field) of DCI (e.g., DCI format 0_1), for a transmission beam of SR PUCCH and a reception beam of PDCCH (i.e., the second spatial parameter for target transmission/reception), a spatial domain Tx filter and a spatial domain Rx filter corresponding to a spatial domain filter by beam indication information (e.g., TCI field) for PUSCH transmission (i.e., the first spatial parameter for reference transmission/reception) may be applied, respectively. Accordingly, it can be expected to improve the efficiency of subsequent uplink scheduling request and downlink data reception by utilizing the high channel quality in the PUSCH transmission beam direction.

In Table 11, an example of the SR PUCCH has been described, but the PUCCH in which the linkage relation is defined by the BLS is not limited to the SR PUCCH. As described in Embodiment 2, BLS may be configured for various PUCCH type(s) that are distinguished based on PUCCH usage/contents/format/whether dedicated PUCCH or not, or the like.

In addition, in Examples of embodiments 2 and 3, an example in which BLS defines an linkage between PUCCH/PUSCH/PDCCH/PDSCH (and its type) has been described, but the scope of the present disclosure is not limited thereto, and BLS PRACH/SRS/CSI-RS/SSB may be further included in reference/target transmission/reception for defining linkage.

Embodiment 4

As described above, based on the change/update of the first spatial parameter of the reference transmission/reception, in changing/updating the second spatial parameter of the target transmission/reception linked with the reference transmission/reception by the BLS, an application time of the changed/updated second spatial parameter needs to be defined.

Example 1) In the case of embodiment 2, after a predetermined time unit (e.g., x msec) after the HARQ-ACK for the PDSCH, which is the reference transmission/reception, is transmitted, the changed/updated second spatial parameter for the target transmission/reception may be applied.

Example 2) In the case of embodiment 3, after a predetermined time unit (e.g., x msec) after the PUSCH, which is the reference transmission/reception, is transmitted, a changed/updated second spatial parameter for target transmission/reception may be applied.

Example 3) When a specific BLS is configured/indicated based on the MAC CE of embodiment 1, after a predetermined time unit (e.g., x msec) after the HARQ-ACK for the PDSCH carrying the MAC CE is transmitted, the changed/updated second spatial parameter for target transmission/reception may be applied.

In the above examples, a predetermined time unit may be defined as an absolute time unit such as x msec, or may be defined as a time unit dependent on SCS such as symbol/slot/slot group/subframe/frame. In addition, the value of x may be a fixed value or a variable value that the base station can configure to be terminal-specific, terminal-common (i.e., cell-specific), or terminal group-specific. For example, when the predetermined time unit is defined as x msec, 0 or 3 may be applied to the value of x.

As described above, a timing for performing change/update of the second spatial parameter for target transmission/reception may be defined based on the BLS. This timing may be defined as a timing after a sufficient time elapses for the base station to confirm that the terminal performs BLS-based spatial parameter change/update.

In the case of Example 1, at a specific time (e.g., after x msec) after the UE transmits the PUCCH/PUSCH carrying the HARQ-ACK (i.e., ACK/NACK) for the PDSCH, a beam for the target transmission and reception may be changed based on the BLS. Here, the transmission of the HARQ-ACK for the PDSCH means that the DCI including the field indicating the BLS for the PDSCH, which is the reference transmission/reception, has been successfully decoded by the terminal. Therefore, it can be confirmed by the base station receiving the HARQ-ACK for the PDSCH that the beam configuration/update for target transmission/reception will be applied by the terminal without separate signaling as to whether the terminal correctly applies the BLS indicated by the base station.

In the case of Example 2, at a specific time (e.g., after x msec) after the UE transmits the PUSCH, a beam for the target transmission and reception may be changed based on the BLS. Here, the transmission of the PUSCH means that the DCI including the field indicating the BLS for the PUSCH, which is the reference transmission/reception, has been successfully decoded by the terminal. Therefore, it can be confirmed by the base station receiving the PUSCH that the beam configuration/update for target transmission/reception will be applied by the terminal without separate signaling as to whether the terminal correctly applies the BLS indicated by the base station.

In the case of Example 3, unlike the operation in which the BLS is indicated based on DCI in Examples 1 and 2, the change/configuration of the BLS may be indicated through the MAC CE. Therefore, the applicable/application timing (e.g., 3 msec after HARQ-ACK transmission for the MAC CE) defined for the update of the general MAC CE-based terminal operation configuration may also be applied to Example 3. Alternatively, in consideration of the additional time required to change the spatial parameter (or spatial domain filter) of the terminal, the value of x may be separately defined/configured based on a value greater than the general MAC CE application timing (i.e., 3 or more).

Figure 16:
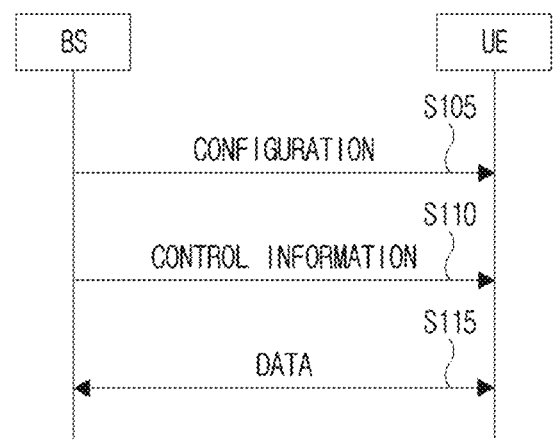
FIG. 16 is a diagram for explaining a signaling process according to an embodiment of the present disclosure.

FIG. 16 is a diagram for explaining a signaling process according to an embodiment of the present disclosure.

An example of the signaling operation of the base station and the terminal for the above-described embodiments may be as shown in FIG. 16. Here, the terminal/base station is just an example, and it may be substituted for various devices as described in FIG. 17. The base station may correspond to one base station including a plurality of TRPs or one cell including a plurality of TRPs. FIG. 16 is for convenience of description, and does not limit the scope of the present disclosure. Also, some of the steps described in FIG. 16 may be merged or omitted. In addition, in performing the procedures described below, the above-described downlink transmission/reception operation or uplink transmission/reception operation or beam management operation may be applied, but the scope of the present disclosure is not limited thereto, and various downlink reception or uplink transmission operations can be applied.

The UE may receive configuration information (Configuration) from the base station (S105). The Configuration may include system information (SI), scheduling information, beam management (BM) related settings (e.g., DL BM related CSI-ResourceConfig IE, NZP CSI-RS resource set IE, etc.), the configuration of the base station (e.g., TRP configuration) information and the like. For example, the Configuration includes information related to reconfiguration/update of RS information for spatial-related (e.g., QCL-related) assumption (e.g., information related to whether reconfiguration/update is performed, performing method, timing, etc.). In addition, the configuration may include information on whether to activate a beam linkage state (BLS) and/or a BLS candidate. The configuration may be transmitted through higher layer (e.g., RRC or MAC CE) signaling. In addition, when the configuration is predefined or preconfigured, the corresponding step may be omitted.

For example, based on the above-described embodiments, the Configuration may include information on at least one of TCI state(s), QCL RS(s), or DMRS port(s). For example, the TCI state may include RS information for spatial relation (e.g., QCL relation) assumption. For example, the configuration may include spatial-related information/QCL-related configuration information for a DL channel (e.g., PDCCH/PDSCH) and/or a UL channel (e.g., PUSCH/PUCCH). For example, as described in the above-described embodiments, the Configuration may include a linkage relation configuration (e.g., BLS information) between the reference transmission and reception (e.g., reference RS/CH) and the target transmission and reception (e.g., target RS/CH)). For example, the target transmission and reception may be grouped and configured as at least one set. For example, the Configuration may include QCL-related information (e.g., RS information for spatial relation assumption, etc.) of a downlink channel (e.g., PDCCH/PDSCH) and/or information indicating change/update for linkage relation configuration (e.g., BLS).

For example, the operation of receiving the Configuration, by the UE (100/200 in FIG. 17), from the base station (200/100 in FIG. 17) in the above-described step S105 may be implemented by the apparatus of FIG. 17 to be described below. For example, referring to FIG. 17, one or more processors 102 may control one or more transceivers 106 and/or one or more memories 104, etc. to receive the Configuration, and one or more transceivers 106 may receive the configuration from the base station.

The UE may receive control information from the base station (S110). The control information may be received through a control channel (e.g., PDCCH). For example, the control information may be DCI/UCI. For example, the control information may include scheduling information for a downlink data channel (e.g., PDSCH) and/or an uplink channel (e.g., PUCCH/PUSCH) and the like. For example, based on the above-described embodiments, the control information may include information on at least one of TCI state(s), QCL RS(s), or DMRS port(s). For example, one or more TCI states may be indicated for DMRS port(s) related to a DL data channel (e.g., PDSCH)/UL channel (e.g., PUCCH/PUSCH) by the TCI state field in the control information (e.g., DCI). For example, the TCI state may include RS information for spatial relation (e.g., QCL relation) assumption.

For example, as described in the above examples, the control information may include linkage relation configuration (e.g., BLS information) between the reference transmission and reception (e.g., reference CH/RS) and the target transmission and reception (e.g., target CH/RS) and/or BLS activation related field, or the like. For example, when the target transmission and reception is PUCCH, a beam linkage relation may be configured for each PUCCH type(s) that can be distinguished based on the usage/contents/format/whether dedicated PUCCH or not of the PUCCH, or the like.

For example, the operation of receiving the control information, by the UE (100/200 in FIG. 17), from the base station (200/100 in FIG. 17) in the above-described step S110 may be implemented by the apparatus of FIG. 17 to be described below. For example, referring to FIG. 17, one or more processors 102 may control one or more transceivers 106 and/or one or more memories 104, etc. to receive the control information, and one or more transceivers 106 may receive the control information from the base station.

The UE may receive data from the base station or transmit data to the base station (S115). The data may be received through a downlink channel (e.g., PDCCH/PDSCH) or transmitted through an uplink channel (e.g., PUCCH/PUSCH/PRACH). In addition, the data may be a downlink signal (e.g., SSB/CSI_RS), an uplink signal (SRS). For example, the data may be scheduled based on the control information. In addition, the data may be received based on the information configured/indicated in steps S105/S110. For example, based on the information configured/indicated in steps S105/S110, the UE may perform channel estimation/compensation and may receive the data. For example, based on the above-described embodiments, a spatial relation-related RS (e.g., QCL type D RS) for receiving the data may be configured. For example, based on spatial relation information of an uplink channel (e.g., PUCCH/PUSCH) transmitted by the UE, a spatial relation-related RS (e.g., QCL type D) for receiving the data (downlink channel) RS) may be configured/changed. For example, based on the usage/contents (e.g., SR, HARQ-ACK/NACK, CSI, etc.) of the uplink channel, a spatial relation-related RS (e.g., QCL type D RS) (of the downlink channel) for receiving the data may be configured.

For example, as described in the above examples, based on the linkage relation, based on spatial related information of the reference transmission and reception linked based on the data (e.g., target CH/RS) and the BLS, the data may be transmitted and received. For example, the reference transmission and reception may be PUCCH/PUSCH/PDCCH/PDSCH.

For example, the terminal may receive the DL channel/RS from the base station and may receive the DL channel/RS based on the spatial related information of reference transmission and reception based on the configured BLS.

For example, the terminal may transmit the UL channel/RS to the base station and may transmit the UL channel/RS based on the spatial related information of reference transmission and reception based on the configured BLS.

For example, the operation of receiving the data, by the UE (100/200 in FIG. 17), from the base station (200/100 in FIG. 17) in the above-described step S115 may be implemented by the apparatus of FIG. 17 to be described below. For example, referring to FIG. 17, one or more processors 102 may control one or more transceivers 106 and/or one or more memories 104, etc. to receive the data, and one or more transceivers 106 may receive the data from the base station.

As mentioned above, the above-described base station/UE signaling and operation (e.g., embodiment 1, embodiment 2, embodiment 3, embodiment 4, FIGS. 15, 16, etc.) can be implemented by the apparatus of FIG. 17 to be described below. For example, the base station may correspond to the first wireless device, the UE may correspond to the second wireless device, and vice versa may be considered in some cases.

Figure 17:
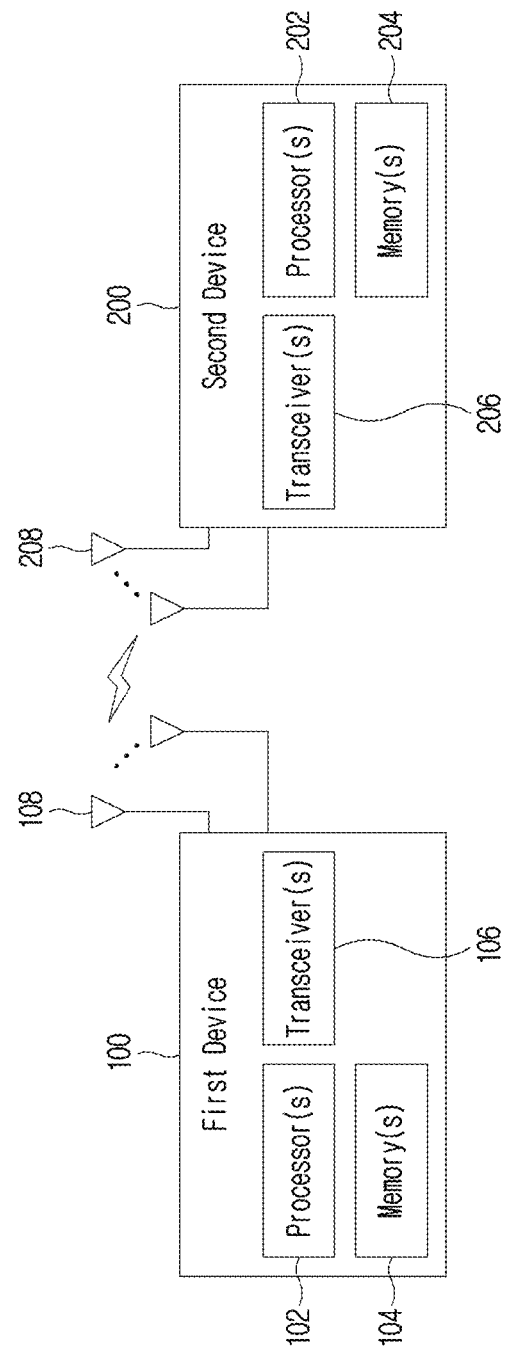
FIG. 17 is a diagram which illustrates a block diagram of a wireless communication device according to an embodiment of the present disclosure.

For example, the base station/UE signaling and operation (e.g., embodiment 1, embodiment 2, embodiment 3, embodiment 4, FIGS. 15, 16, etc.) described above may be processed by one or more processors (e.g., 102, 202) of FIG. 17, and the above-described base station/UE signaling and operation (e.g., embodiment 1, embodiment 2, embodiment 3, embodiment 4, FIG. 15, FIG. 16, etc.) may be stored in a memory (e.g., one or more memories 104 and 204 of FIG. 17) in the form of an instruction/program (e.g., instruction, executable code) for driving at least one processor of FIG. 17 (e.g., 102 and 202).

General Device to which the Present Disclosure May be Applied

FIG. 17 illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206.

One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving linkage information included in physical downlink shared channel (PDSCH)-related information,
wherein the linkage information is based on a transmission configuration indicator (TCI) state for a reference spatial information for downlink reception, and is related to a mapping relationship between the reference spatial information and a target spatial information; and
performing uplink transmission based on the target spatial information,
wherein the target spatial information corresponds to a spatial transmission filter for the uplink transmission which is determined based on the reference spatial information.

2. The method of claim 1,
wherein the linkage information is associated with at least one reference transmission and reception and at least one target transmission and reception.

3. The method of claim 1,
wherein the receiving the linkage information comprising:
receiving configuration information on at least one linkage information candidate; and
receiving information on the linkage information among the at least one linkage information candidate.

4. The method of claim 3,
wherein the configuration information on at least one linkage information candidate is provided by a higher layer signaling, and
wherein the linkage information is indicated to be activated among the at least one linkage information candidate and indication for activation of the linkage information is provided by a higher layer signaling or lower layer signaling.

5. The method of claim 1,
wherein a correspondence between the reference spatial information and the target spatial information is predetermined.

6. The method of claim 1, further comprising:
receiving information on whether an operation based on the linkage information is enable or not.

7. The method of claim 1,
wherein the linkage information is configured via higher layer signaling.

8. The method of claim 1,
wherein the PDSCH-related information includes a TCI field included in downlink control information for scheduling PDSCH.

9. An Apparatus comprising:
at least one transceiver; and
at least one processor coupled with the at least one transceiver,
wherein the at least one processor is configured to:
receive, through the at least one transceiver, linkage information included in physical downlink shared channel (PDSCH)-related information,
wherein the linkage information is based on a transmission configuration indicator (TCI) state for a reference spatial information for downlink reception, and is related to a mapping relationship between the reference spatial information and a target spatial information;
performing, through the at least one transceiver, uplink transmission based on the target spatial information,
wherein the target spatial information corresponds to a spatial transmission filter for the uplink transmission which is determined based on the reference spatial information.

10. The apparatus of claim 9,
wherein the linkage information is associated with at least one reference transmission and reception and at least one target transmission and reception.

11. The apparatus of claim 9,
wherein the at least one processor is configured to:
receive configuration information on at least one linkage information candidate; and
receive information on the linkage information among the at least one linkage information candidate.

12. The apparatus of claim 11,
wherein the configuration information on at least one linkage information candidate is provided by a higher layer signaling, and
wherein the linkage information is indicated to be activated among the at least one linkage information candidate and indication for activation of the linkage information is provided by a higher layer signaling or lower layer signaling.

13. The apparatus of claim 9,
wherein a correspondence between the reference spatial information and the target spatial information is predetermined.

14. The apparatus of claim 9,
wherein the at least one processor is configured to receive information on whether an operation based on the linkage information is enable or not.

15. The apparatus of claim 9,
wherein the linkage information is configured via higher layer signaling.

16. The apparatus of claim 9,
wherein the PDSCH-related information includes a TCI field included in downlink control information for scheduling PDSCH.

17. A method comprising:

transmitting linkage information included in physical downlink shared channel (PDSCH)-related information, wherein the linkage information is based on a transmission configuration indicator (TCI) state for a reference spatial information for downlink transmission, and is related to a mapping relationship between the reference spatial information and a target spatial information; and receiving an uplink channel or an uplink signal transmitted based on the target spatial information, wherein the target spatial information corresponds to a spatial transmission filter for the uplink channel or the uplink signal which is determined based on the reference spatial information.

* * * * *